United States Patent [19]

Maük et al.

[11] Patent Number: 4,566,514
[45] Date of Patent: Jan. 28, 1986

[54] PNEUMATIC VEHICLE TIRE

[75] Inventors: Gerhard Maük, Wunstorf; Heinrich Huinink, Garbsen, both of Fed. Rep. of Germany

[73] Assignee: Continental Gummi-Werke Aktiengesellschaft, Hanover, Fed. Rep. of Germany

[21] Appl. No.: 628,349

[22] Filed: Jul. 6, 1984

[30] Foreign Application Priority Data

Jul. 8, 1983 [DE] Fed. Rep. of Germany ....... 3324649

[51] Int. Cl.⁴ ............................................. B60C 11/12
[52] U.S. Cl. .......................... 152/209 R; 152/DIG. 3; 425/28 D
[58] Field of Search ........... 152/209 R, 209 A, 209 B, 152/209 NT, 209 WT, 330 R, DIG. 1, DIG. 3; 425/28 D

[56] References Cited

U.S. PATENT DOCUMENTS 2,240,542  5/1941  Bourdon ............................ 152/209
3,608,602  9/1971  Youngblood ....................... 152/212
4,298,046  11/1981 Herbelledu et al. ............. 152/209 R
4,303,115  12/1981 Fletchner et al. .............. 152/209 R

FOREIGN PATENT DOCUMENTS 1480932  3/1969  Fed. Rep. of Germany .
3118407  12/1982 Fed. Rep. of Germany .
  28439  6/1969  Luxembourg .

Primary Examiner—Lois E. Boland
Attorney, Agent, or Firm—Becker & Becker, Inc.

[57] ABSTRACT

A pneumatic vehicle tire which has fine slits in the tread. These slits are inclined relative to the circumferential direction of the tire. In order to increase the frictional connection to the roadway, to make the wear of the tread more uniform, and in addition to be able to use mechanically stiff plates for the associated vulcanization molds, the fine slits are twisted about an at least approximately radially extending twist axis. The fine slits preferably extend continuously from their roots into the tread surface region proper.

11 Claims, 7 Drawing Figures

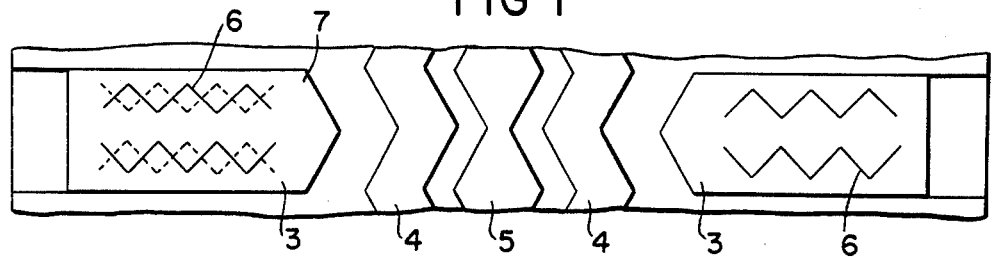
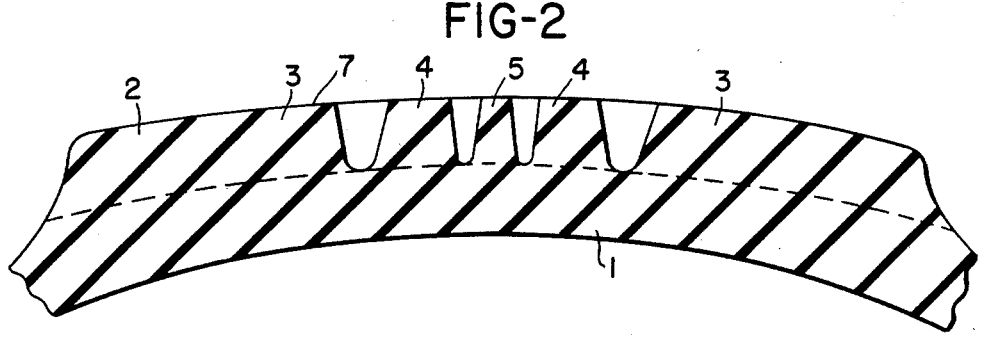
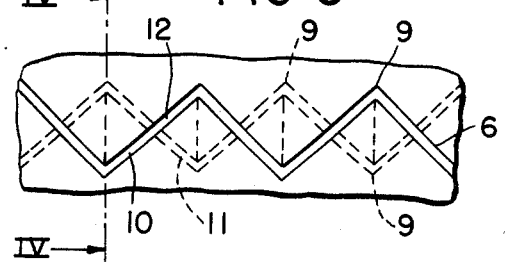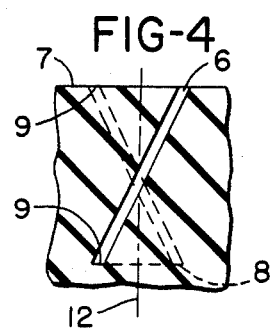
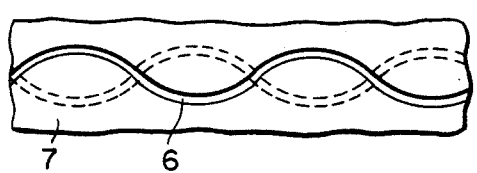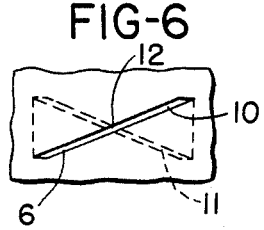
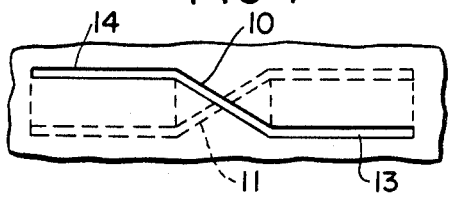

PNEUMATIC VEHICLE TIRE

BACKGROUND OF THE INVENTION

1. Field of the Invention

The present invention relates to a pneumatic vehicle tire having fine slits which are disposed in the tread and which are inclined relative to the circumferential direction of the tire.

These fine slits serve to increase the traction of the tire. At the same time, they can assist in making compact blocks in the region of the tread softer and more flexible. Fine slits refer to such profile recesses which make use of practically parallel surfaces at opposite locations which in turn are spaced apart by approximately 0.4 to 1.2 mm. These fine slits are generally formed in the vulcanization mold by means of steel plates that are rigidly anchored therein.

2. Description of the Prior Art

It is known to successively dispose in the circumferential direction of the tire fine slits which are formed by planar plates and which rise in various directions relative to the circumferential direction of the tire; i.e., both in and counter to the circumferential direction.

Special effects can be achieved with such a rise during breaking and acceleration; the edges of the fine slits, i.e. the walls which delimit the slits, can be raised and can increase contact with the ground. However, these heretofore known embodiments have the drawback that non-uniform wear results in the tread region. Saw-tooth formations can result.

An object of the present invention is to increase the frictional connection of the tire to the ground, to make the wear pattern or the wear itself more uniform, and in addition to improve the life expectancy of the plate which is used for forming the fine slits and which is critical for the life expectancy of the vulcanization mold.

BRIEF DESCRIPTION OF THE DRAWING

This object, and other objects and advantages of the present invention, will appear more clearly from the following specification in conjunction with the accompanying drawing, in which:

FIG. 1 is a partial diagrammatic plan view of the tread of one inventive embodiment of a pneumatic vehicle tire for road vehicles;

FIG. 2 is a radial section through the tire section shown in FIG. 1;

FIG. 3 shows a portion of the tire of FIG. 1, namely a partial plan view of one of the profiled elements thereof;

FIG. 4 is a section taken along line IV—IV in FIG. 3;

FIG. 5 shows a modification of the fine slits; and

FIGS. 6 and 7 are partial plan views of the profiled blocks, ribs, or the like of a pneumatic vehicle tire for road traffic and each shows further embodiments for the fine slits.

SUMMARY OF THE INVENTION

The pneumatic vehicle tire of the present invention is characterized primarily in that the fine slits are twisted about an at least approximately radially extending twist axis.

The fine slits preferably extend continuously radially outwardly from their root or base sections to the tread surface sections; in addition, these sections, i.e. the root sections and the sections disposed directly in the tread surface, form different angles with the circumferential direction of the tire. These angles may have at least approximately the same value.

The plates of the vulcanization mold which forms such fine slits must be twisted or shaped in a corresponding manner. For this reason, the plates have a greater strength than do planar, inclined rising plates. This strength in particular must be expressed in a relatively great rigidity when the rubber is pressed into the recesses of the vulcanization mold during manufacture of the tire. Furthermore, as a result of the angular positions of the fine slits, there results an improved road traction without, however, having to make allowance for a saw-tooth formation in the tread strip due to the non-uniformity of the angular rise (as compared to a planar, inclined rising fine slit arrangement).

Pursuant to further specific features of the present invention, the fine slits can have a zigzag or wave-like configuration. With regard to the interval thereof in the tread surface region and in the root region of the profiled elements, the fine slits are preferably offset by half of the interval of the zigzag or wave shape.

When viewing the tire tread in plan, the fine slits may define an "X" when considering, the tread surface section and the root section. Fine slits having this configuration may interconnect opposed, inclined rising, planar fine slits.

The twist axis may be located approximately halfway along the length of the associated sections. The twist, which corresponds to the angle of the tread surface section and the root section relative to one another, may be approximately 30° to 100°.

DESCRIPTION OF PREFERRED EMBODIMENTS

Referring now to the drawing in detail, the tread 2, which is located above the tire foundation 1, is provided at both edges thereof with essentially rectangular blocks 3 which are disposed transverse to the circumferential direction of the tire. At the edges of the tread, these blocks 3 form circumferential rows, between which are disposed two zigzagged circumferential ribs 4; disposed in turn between these ribs 4 is a further circumferential rib 5 which is disposed in the center of the tread. The sides of the rib 5 conform to the zigzag shape of the circumferential ribs 4.

The blocks 3 are provided with zigzagged fine slits 6 which extend essentially transverse to the circumferential direction of the tire, and also extend approximately parallel to one another. The fine slits 6 pass through the entire height of the blocks 3, and have a width of approximately 0.5 mm. Pursuant to the illustrated embodiment, the fine slits 6 end prior to the edges of the blocks 3. However, the fine slits could just as easily be open to the edges of the blocks 3.

As can be seen from FIGS. 3 and 4, the fine slits 6 follow a zigzagged path not only in the tread surface 7 but also at their base 8, i.e. in the root of the blocks 3. However, on a given side of the fine slits 6, the points or apexes 9 formed by the zigzag are not disposed radially above one another; instead, they are offset relative to one another by one-half of the zigzag interval. In other words, a section 10 of the slit 6 which is disposed in the tread surface 7 and rises toward the right merges in a continuous manner into an inclined section 11 of the slit 6, which section 11 is disposed in the root of the block 3, via a twist about a radial axis shown at 12. This occurs such that the sections 10 and 11 are both inclined at approximately 45° to the circumferential direction of the tire, yet rise in opposite directions, with one rising to the left and the other to the right.

In the embodiment of FIG. 5, the zigzag shape of the fine slits 6 is replaced by a wave-like shape. This illustration shows particularly clearly the offset of the wave line in the tread surface 7 on the one hand and in the base or root of the block 3 on the other hand. Hereto the fine slits, or the plates of the vulcanization mold which form them, merge continuously from the tread surface 7 into the root region at 8.

The sections 10 and 11 illustrated in FIG. 3 in connection with the radial twist axis 12 also can be utilized in the isolated arrangement of FIG. 6. This embodiment, of course, can be utilized in the blocks 3 or the like by placing a number of such arrangements next to one another.

The profiling of FIG. 6 also could be auxiliarily used in the embodiment of FIG. 7 for fine slits which are provided with planar, non-twisting sections 13, 14 having oppositely directed inclined rises. In order to be able to couple these sections 13, 14 in an effective and stable manner, they merge into one another via the interposition of a fine slit of the type illustrated in FIG. 6. As a whole, the fine slit of FIG. 7 is formed in the vulcanization mold by a single plate, the effectiveness and stability of which is achieved by the shape shown in FIG. 6.

It should also be noted that the twist axis 12 is preferably located halfway along the length of the sections 10, 11 in order to achieve a symmetrical construction. Furthermore, the twist is approximately between 30° to 100°, i.e. the angle which the sections 10, 11 of FIG. 3 form with one another.

The present invention is, of course, in no way restricted to the specific disclosure of the specification and drawing, but also encompasses any modifications within the scope of the appended claims.

What we claim is:

1. A pneumatic vehicle tire which includes a tread in which are disposed fine slits which are inclined relative to the circumferential direction of said tire, and which are twisted about a twist axis which extends at least approximately radially.

2. A tire according to claim 1, in which said fine slits extend continuously from the radially outer tread surface area of said tread to the radially inner root area thereof, and form varying angles in said areas relative to the circumferential direction of said tire.

3. A tire according to claim 2, in which the angles which said fine slits form with the circumferential direction of said tire are at least approximately of the same magnitude.

4. A tire according to claim 3, in which said fine slits have a zigzag configuration.

5. A tire according to claim 4, in which the interval of said zigzagged fine slits in the radially outer tread surface area of said tread is offset by about half the interval of said zigzag shape from the interval of said fine slits in the radially inner root area of said tread.

6. A tire according to claim 3, in which said fine slits have a wave-like configuration.

7. A tire according to claim 6, in which the interval of said wavy fine slits in the radially outer tread surface area of said tread is offset by about half the interval of said wave-like shape from the interval of said fine slits in the radially inner root area of said tread.

8. A tire according to claim 1, when viewed in plan upon the tread surface of said tread, the portions of said fine slits in the radially outer tread surface area of said tread and in the radially inner root area thereof describe X's.

9. A tire according to claim 8, in which said tread further includes planar fine slits, successive ones of which have opposed slopes relative to a plane through the axis of said tire, with successive ones of said planar fine slits being interconnected by said X-configured fine slits.

10. A tire according to claim 1, in which said twist axis is disposed approximately halfway along the length of a given section of one of said fine slits.

11. A tire according to claim 1, in which the twist of said fine slits, i.e. the angle of that portion of a given fine slit in the radially outer tread surface area of said tread to that portion of said given fine slit in the radially inner root area of said tread, is approximately 30° to 100°.

* * * * *